(12) United States Patent
Buenfeld et al.

(10) Patent No.: US 6,685,822 B2
(45) Date of Patent: Feb. 3, 2004

(54) PROCESS FOR THE PROTECTION OF REINFORCEMENT IN REINFORCED CONCRETE

(75) Inventors: Nicholas Robert Buenfeld, Surrey (GB); Gareth Kevin Glass, Lichfield (GB); Bharti Reddy, London (GB); Robert Franklyn Viles, West Midlands (GB)

(73) Assignee: Imperial College of Science Technology and Medicine, London (GB)

( * ) Notice: Subject to any disclaimer, the term of this patent is extended or adjusted under 35 U.S.C. 154(b) by 0 days.

(21) Appl. No.: 10/182,377

(22) PCT Filed: Jan. 26, 2001

(86) PCT No.: PCT/GB01/00357

§ 371 (c)(1),
(2), (4) Date: Oct. 2, 2002

(87) PCT Pub. No.: WO01/55056

PCT Pub. Date: Aug. 2, 2001

(65) Prior Publication Data

US 2003/0075457 A1 Apr. 24, 2003

(30) Foreign Application Priority Data

Jan. 27, 2000 (GB) .............................................. 0001847

(51) Int. Cl.[7] .............................................. C23F 13/00
(52) U.S. Cl. .................... 205/734; 205/740; 204/196.1; 204/196.36; 204/196.37
(58) Field of Search ................................ 205/734, 740; 204/196.1, 196.36, 196.37

(56) References Cited

U.S. PATENT DOCUMENTS

| | | | | | |
|---|---|---|---|---|---|
| 5,174,871 A | * | 12/1992 | Russell | ........................ | 205/734 |
| 5,198,082 A | * | 3/1993 | Vennesland et al. | ........ | 205/734 |
| 5,312,526 A | * | 5/1994 | Miller | ........................ | 205/734 |
| 5,407,543 A | * | 4/1995 | Miller | ........................ | 205/766 |
| 5,650,060 A | * | 7/1997 | Huang et al. | ................ | 205/730 |
| 5,750,276 A | * | 5/1998 | Page | ........................... | 428/703 |
| 6,159,552 A | * | 12/2000 | Riman et al. | ................ | 427/436 |
| 6,322,691 B1 | * | 11/2001 | Miller | ........................ | 205/687 |
| 6,322,898 B1 | * | 11/2001 | Riman et al. | ................ | 428/469 |
| 6,398,945 B1 | * | 6/2002 | Henriksen | ................... | 205/734 |

FOREIGN PATENT DOCUMENTS

| | | |
|---|---|---|
| WO | WO 99 01406 A | 1/1999 |
| WO | WO 99 01407 A | 1/1999 |

* cited by examiner

*Primary Examiner*—Bruce F. Bell
(74) *Attorney, Agent, or Firm*—Nixon & Vanderhye

(57) ABSTRACT

The invention provides a reinforced concrete having improved corrosion resistance in which the content of voids in the concrete at the surface of the steel reinforcement is below 0.8%, preferably below 0.5%, more preferably below 0.2% by area of steel and in which there is a layer of solid alkali, preferably at least one micron in thickness on the steel surface. The reinforced concrete preferably has a chloride threshold level of at least 0.5% preferably at least 0.8% by weight of the cement. The invention also provides a process for reducing corrosion of steel reinforcement in concrete which comprises forming a reinforced concrete in which the voids at the steel surface are below 0.5% by volume and in which there is a layer of solid alkali on the steel surface the layer being at least 1 micron in thickness and covering at least 20% of the steel surface.

16 Claims, 11 Drawing Sheets

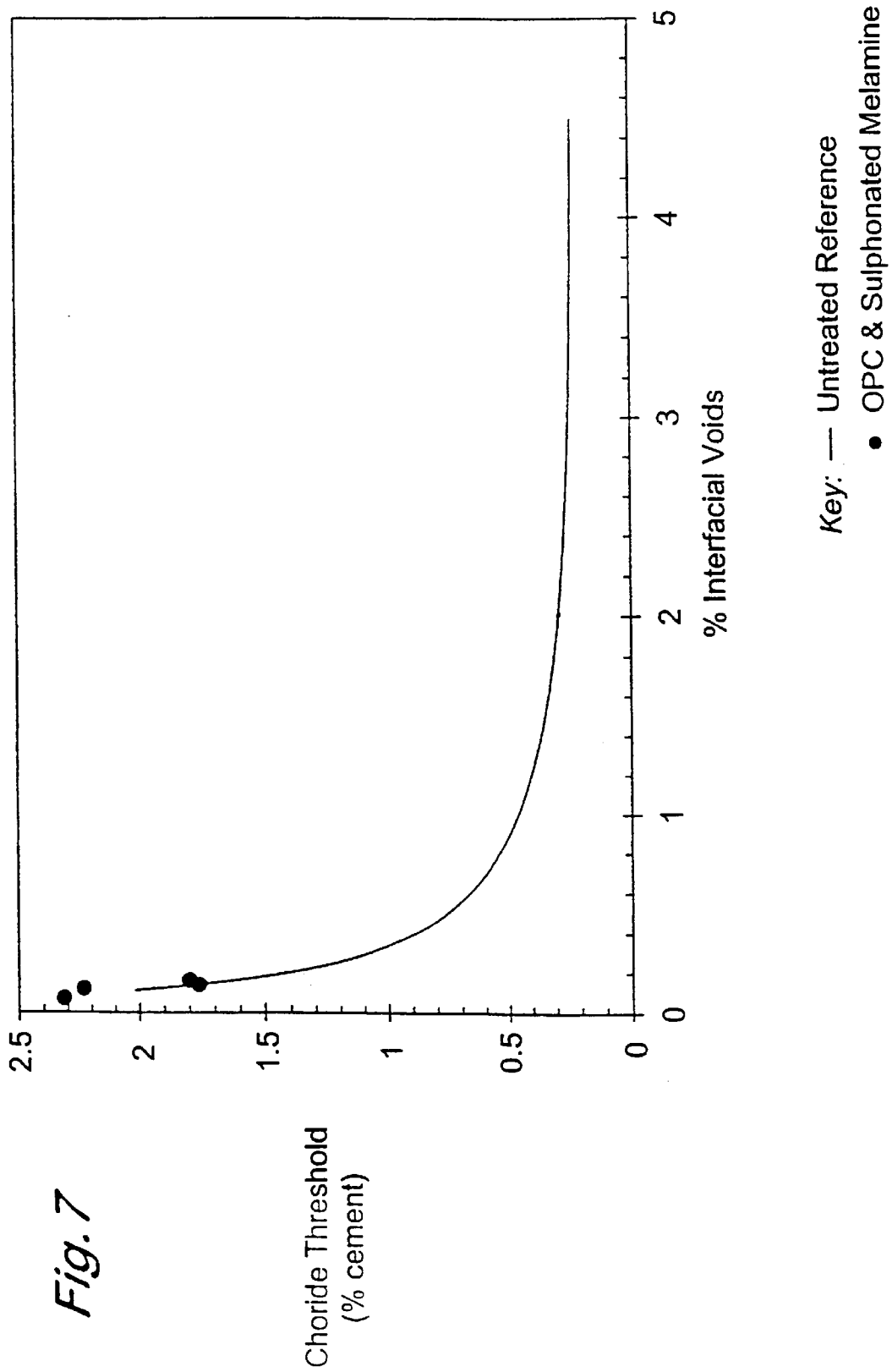

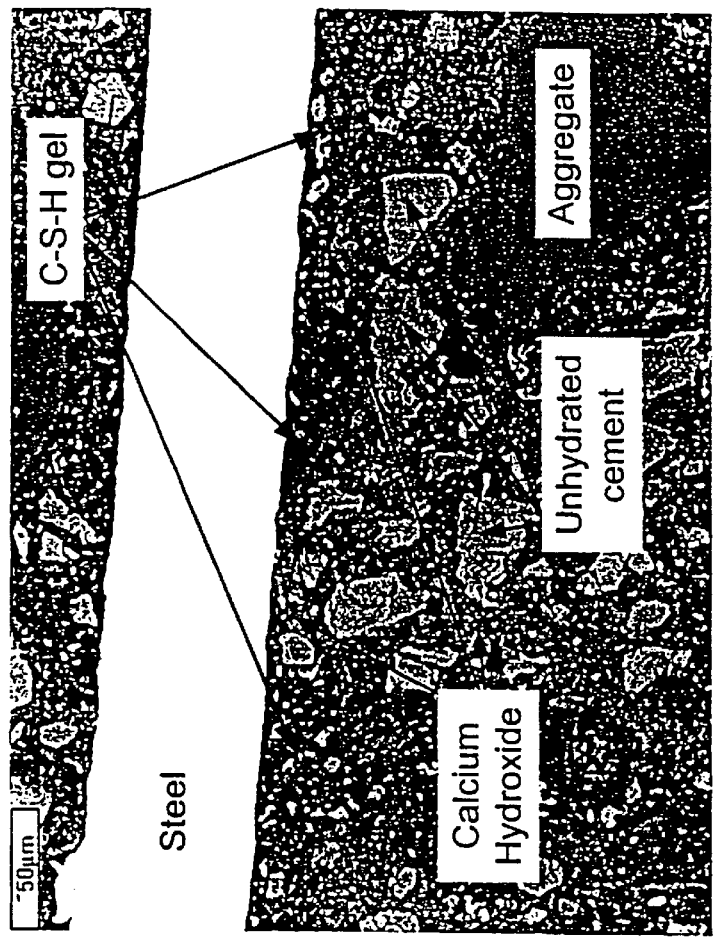

Fig. 8

A backscatted electron image obtained in the scanning electron microscope of polished section through steel in concrete. The grey scales in these images depends on the electron density of the material. The phases of interest, graded in terms of their brightness, are the steel (lightest) > unhydrated cement grains > calcium hydroxide (CH) > gel (predominantly calcium silicate hydrate (C-S-H) ~ aggregate > porosity and voids (darkest). There is no general indication of any preferential formation of calcium hydroxide at the steel.

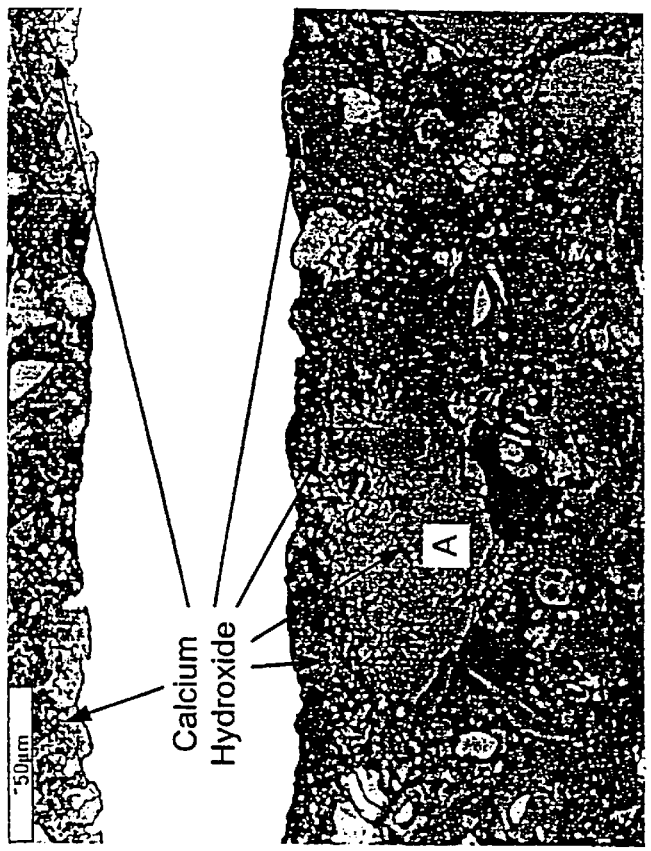

Fig. 9

A backscattered electron image obtained in the scanning electron microscope of polished section through steel in concrete. The steel was coated with a saturated solution of calcium nitrate which was then oven dried. There is a general indication that more calcium hydroxide forms in the vicinity of the steel. The feature marked A is relatively pure (free of silica contamination) and may have resulted from the reaction of a crystal of calcium nitrate with the pore solution of the hydrating cement.

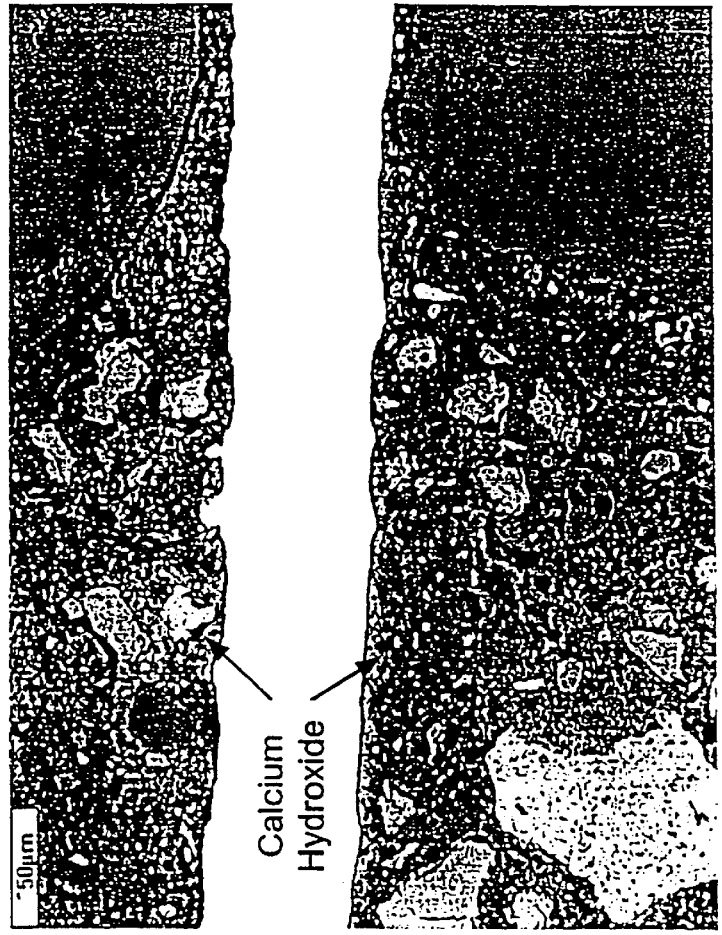

Fig. 10

Electrochemically treated concrete with Ca(NO₃)₂ admixture (ETC1-2)

A backscattered electron image obtained in the scanning electron microscope of polished section through steel in concrete. The concrete contained 5% calcium nitrate by weight of cement. A current was passed to the steel while the concrete was setting and curing. There is a clear indication of a layer of calcium hydroxide on the steel. Note there is also generally more calcium hydroxide in the cement paste.

Charge passed to electrochemically treated specimen held at -800mV (SCE) (ETC1-2) compared with charge passed when coupled to a zinc anode placed directly in the concrete.

PROCESS FOR THE PROTECTION OF REINFORCEMENT IN REINFORCED CONCRETE

FIELD OF THE INVENTION

This invention relates to a process for the protection against corrosion of the steel reinforcement in reinforced concrete and to novel reinforced concretes having improved resistance to corrosion.

BACKGROUND OF THE INVENTION

Steel reinforcement in concrete is normally protected against corrosion by a passive film that forms on its surface in the alkaline environment in the concrete. However, with the passage of time alkalinity may be lost by the action of atmospheric carbon dioxide and corrosion may result either from this loss of alkalinity or from the contamination of the concrete with aggressive ions such as chloride. Both these processes render the protective passive film unstable.

When the concrete is highly alkaline it tolerates a small level of chloride ions without corrosion of the steel being initiated. However the higher the chloride content the higher is the risk of chloride induced corrosion. The chloride content that results in corrosion initiation is termed the chloride threshold level. The initiation of corrosion may be detected electrically and is marked by a sharp increase in electrical current. It has been reported that chloride contents above 0.2% by weight of cement will initiate corrosion in many reinforced concrete structures.

It has therefore been previously proposed to remove chloride by an electrochemical process. The process has been described in WO 98/35922, and European Patent Nos 200,428 and 398,117 and involves passing an electric current through the concrete by applying a voltage for example from 3 to 15 volts between an external temporary anode and the steel reinforcement in the concrete as cathode. The effect is to cause chloride ions to migrate through the concrete to the surface and into a layer of electrolyte which has been placed at the surface.

It has been previously reported that a factor affecting corrosion initiation in chloride contaminated concrete is entrapped air voids. Concrete typically contains about 1.5% by volume of entrapped air. The presence of voids at the steel surface increases the risk of the local environment being altered by the presence of chloride ions to generate conditions in which the passive film is unstable. The solid hydration products of cement, which are absent at these locations. would otherwise have corrosion inhibiting properties that resist such changes.

PROBLEM TO BE SOLVED BY THE INVENTION

The effects of loss of alkalinity by the action of carbon dioxide in the atmosphere. chloride contamination and the presence of voids in the concrete mean that with the passage of time the steel reinforcement becomes susceptible to corrosion. The present invention provides a means of reducing this problem in which the resistance of the steel to corrosion is increased by controlling the amount of air voids in the concrete and providing a layer of solid alkali on the steel surface.

SUMMARY OF THE INVENTION

According to the present invention there is provided a reinforced concrete wherein the content of voids in the concrete at the surface of the steel reinforcement is below 0.8%, preferably below 0.5%, more preferably below 0.2% by area of steel and in which there is a layer of solid alkali on the steel surface.

ADVANTAGE EFFECT OF THE INVENTION

The provision of the layer of alkali and the low void content has the effect of inhibiting corrosion. The combination raises the chloride threshold for chloride induced corrosion from levels in the region of 0.2% chloride by weight of cement to above 0.5% and even above 1.5% or 2%. This greatly enhances the durability of reinforced concrete.

BRIEF DESCRIPTION OF THE DRAWINGS

FIG. 7 gives the results obtained in Example 4.

FIGS. 8, 9 and 10 are backscattered electron images obtained in a scanning electron microscope of a polished section through the steel in the concrete.

FIG. 8 shows the result for comparative Example 6.

FIG. 9 shows the result for Example 7 and

FIG. 10 shows the result for Example 8.

DETAILED DESCRIPTION OF THE INVENTION

Figure 1:
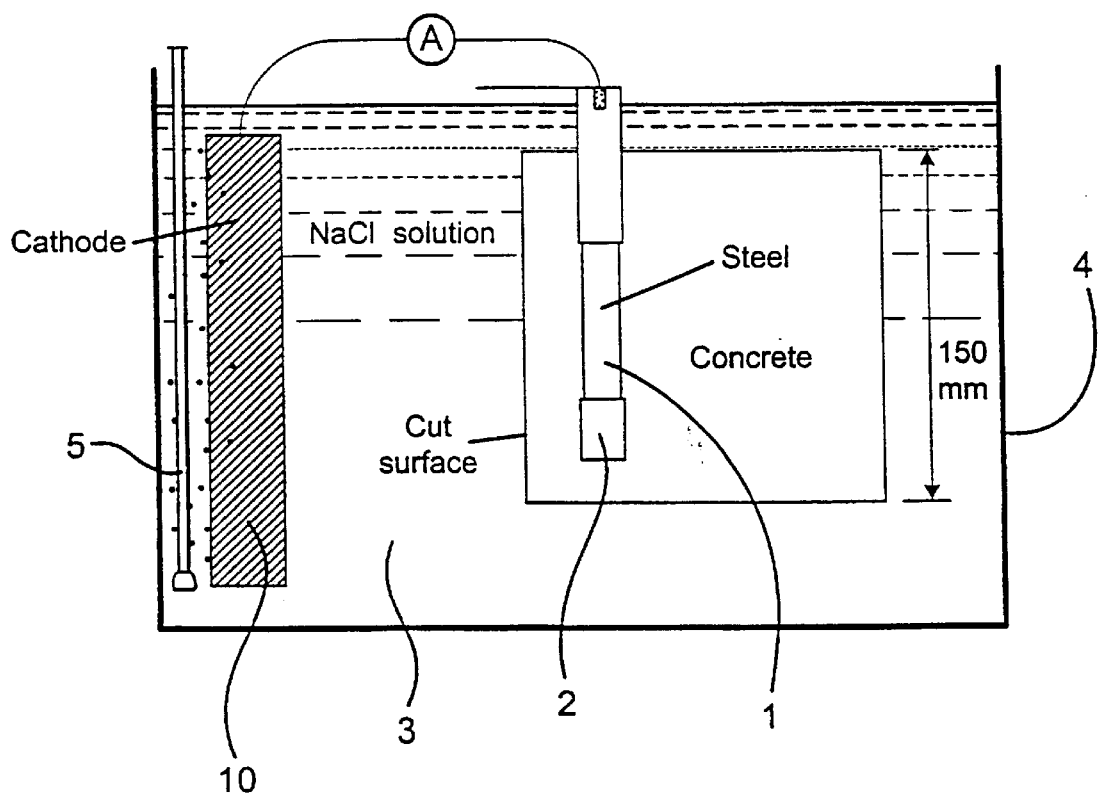
FIG. 1 illustrates the apparatus employed in the Examples.

The term solid alkali includes compounds whose saturated solution in water has a pH of over 10. Such compounds maintain the passive film stable and resist a pH fall to values where corrosion may occur, typically below 8.5. Examples include calcium hydroxide, calcium-silicate hydrate gel, various calcium aluminate hydrates and lithium hydroxide.

The term cement in the present specification includes all the binders in the concrete.

The term voids refers to cavities that contain no solid phases of the concrete whose maximum diameter is at least 100 microns. For the avoidance of doubt the voids are not necessarily spherical in shape and may be spheroidal or irregular.

Preferably the layer of alkali is from 1 to 500 microns in thickness preferably not more than 100 microns most preferably not more than 80 microns in thickness. Preferably the layer covers at least 20% more preferably at least 60%, most preferably at least 70% of the steel.

The reinforced concrete preferably has a chloride threshold level of at least 0.5, preferably at least 0.8% by weight of the cement. According to a preferred embodiment of the invention a reinforced concrete in which the content of voids at the steel surface is below 0.8% preferably below 0.5% by area of the steel has one or more sacrificial anodes connected to the reinforcement to produce a current sufficient to cause the formation of alkali on the surface of the steel but avoid the discharge of hydrogen gas.

According to another embodiment of the invention a process for reducing corrosion of steel reinforcement in concrete comprises forming a reinforced concrete in which the voids at the steel surface are below 0.8%, preferably below 0.5% by area of steel and passing a direct electric current between an anode and the reinforcement as cathode to form a layer of solid alkali on the steel surface the layer being at least 1 micron in thickness and covering at least 20%, preferably at least 60% of the steel.

The process may be effected as described in European Patent No 264,421 or U.S. Pat. No. 4,865,702 with the addition of steps to soak, preferably to saturate, the concrete to place pore solution in the entrapped voids at the steel surface.

The process of the invention may be applied to concrete which is either freshly placed or aged and carbonated.

According to one embodiment of the present invention a process for improving the corrosion resistance of steel reinforcement in reinforced concrete comprises: soaking, preferably saturating, the concrete with water to cause the water to penetrate the concrete and passing a direct electric current between an external anode and the steel reinforcement as cathode and continuing the passage of the electric current for sufficient time to form a layer of solid alkali e.g. calcium hydroxide at least one micron in thickness on the surface of the reinforcement.

Conveniently to enhance the formation of calcium hydroxide or other alkali one or more of the following steps is included:
  (i) an additional source of calcium ions is included in the concrete forming mixture or on the steel prior to casting the concrete
  (ii) means is included in the concrete forming mixture to assist the migration of calcium ions
  (iii) an agent is included in the concrete forming mixture to modify the morphology of the calcium hydroxide
  (iv) a solid alkali is applied to the reinforcement before casting the concrete, the material and its application being designed to resist any significant loss of its inhibitive properties when in contact with the air prior to casting the concrete
  (v) means is included in the concrete forming mixture for reducing entrapped air voids
  (vi) a material is applied to the reinforcement before casting the concrete that will react with the pore solution in the concrete to precipitate solid alkali on the reinforcement.

The additional source of calcium ions included in the concrete-forming mixture may be a calcium salt for example calcium nitrate or nitrite.

By additional source of calcium ions is meant in addition to the sources of calcium ions that are usually present in the Portland cement calcium aluminate cement and pozzolanic cement used in concrete manufacture. Suitable amounts are such as to provide an amount of calcium ions of at least 0.1% and preferably from 1 to 5% by weight of cement in the concrete.

The means to assist migration of calcium ions may be any agent that will enhance the solubility of calcium ions for example a sequestering agent such as ethylene diamine tetra acetic acid.

The agent to modify the morphology of calcium hydroxide may be a polysaccharide or a compound such as diethylene glycol ether.

The layer of alkali, which may be calcium hydroxide, may be applied to the reinforcement by a coating process such as electrostatic spraying. This provides a reservoir of alkali on the reinforcement which maintains the alkalinity.

A material that may precipitate solid alkali on the steel when brought into contact with the pore solution of the concrete is calcium nitrate. This will react with the sodium and potassium hydroxides in the pore solution to produce sparingly soluble calcium hydroxide.

According to another aspect of the invention a process for reducing corrosion of steel reinforcement in reinforced concrete comprises:
  soaking the concrete with water to cause the water to penetrate the concrete and passing a direct electric current between an anode and the steel reinforcement as cathode to form a layer of solid alkali preferably at least one micron in thickness on the steel surface.

According to another aspect of the invention a process for improving the corrosion resistance of steel in reinforced concrete comprises, prior to casting the concrete, applying to the steel a solid alkali, preferably to provide a layer at least one micron and less than 500 microns in thickness on the steel surface and then casting the concrete.

The solid alkali may be formed in situ by applying a material which will react with the pore solution of the concrete to form the solid alkali.

The invention is illustrated by the following Examples.

EXPERIMENTAL PROCEDURE COMMON TO EXAMPLES 1 to 5.

In all the Examples the chloride content required to initiate corrosion of steel embedded in concrete (the chloride threshold level) was measured using the apparatus shown in FIG. 1.

Concrete specimens which contained a centrally located 20 mm diameter mild steel bar (1) were cast in a 150 mm cube mould.

Prior to casting the mild steel bars were cleaned to remove oxide scale and the bar ends were masked using a cementitious coating (2) to put alkali on the steel in the masked area and finally covered with heat shrink insulation covering. The section of bar exposed to the concrete was 100 mm in length.

The concrete specimens were prepared using 275 kg/cubic metre cement.

The cement was (i) ordinary Portland cement or (ii) sulphate resistant Portland cement or (iii) a 70:30 blend by weight of ordinary Portland cement and pulverized fly ash (PFA) or (iv) a 35:65 blend by weight of ordinary Portland cement and ground granulated blast furnace slag (GGBS). In addition to the cement there was used 680 kg/cubic metre of fine aggregate (grade M sand) and 1230 kg/cubic metre of 10 mm aggregate. The free w/c ratio was 0.4.

Figure 2:
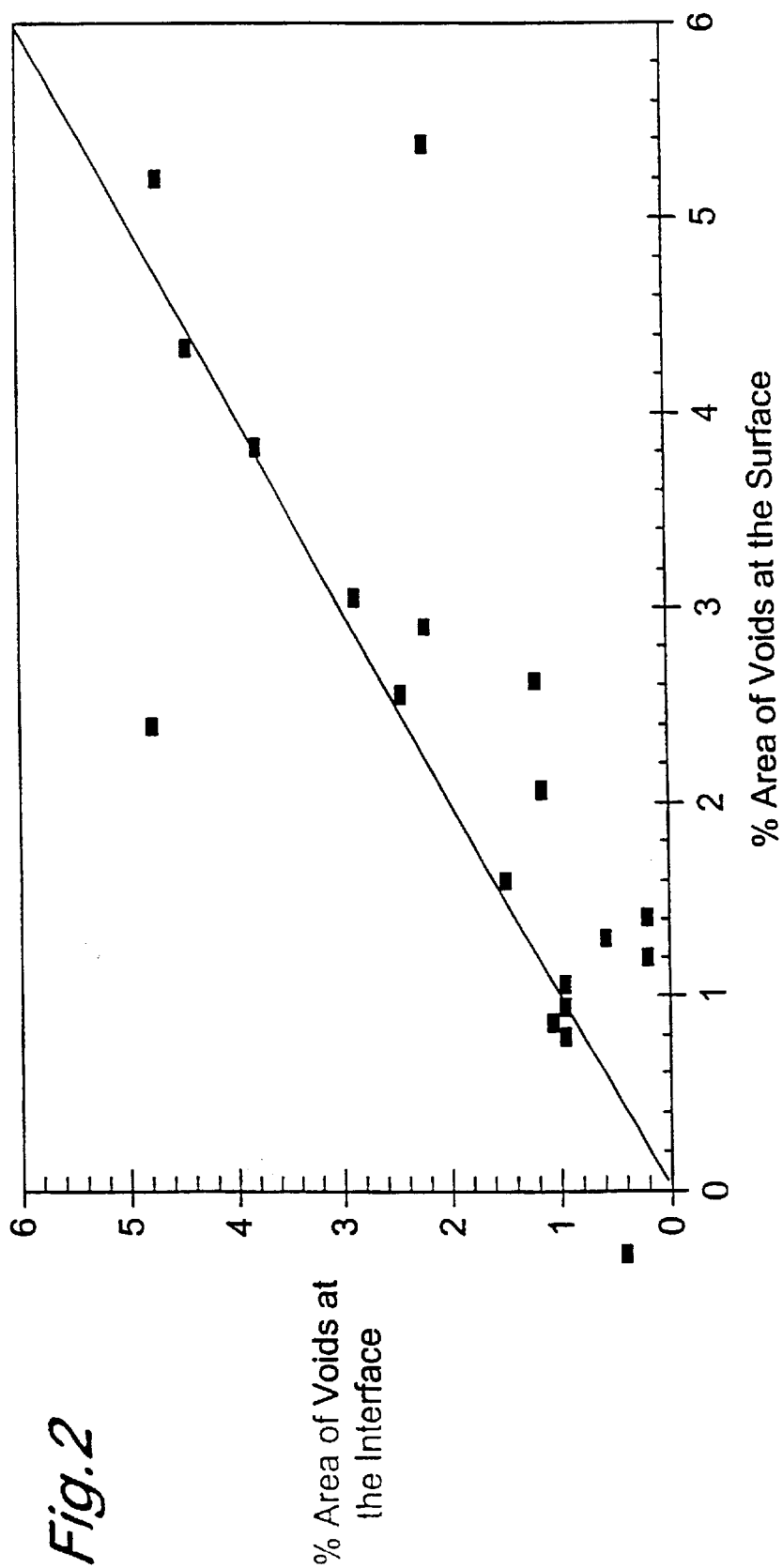
FIG. 2 gives the calibration between the voids at a cast surface and the voids at the steel-concrete interface.

This concrete mix design was chosen because, by varying the degree of compaction, it was possible to reproduce under laboratory conditions the entrapped air content typically found in real concrete structures. After curing for a minimum of one month wrapped in plastic, the cover of each specimen was reduced to 15 mm by cutting a slice off one side of the cube parallel to the steel bars. A barrier coating was applied to the remaining cast surfaces. The specimens were saturated with water, and then immersed in a tank (4) containing a sodium chloride solution (3). The end of the steel that protruded from the specimen was electrically connected to an external cathode (10) consisting of activated titanium mesh immersed in the sodium chloride solution in the tank. The solution 3 in the tank was aerated by an aerator device (5) and circulated using a pump (not shown). The current flowing between the reinforcement and the cathode was measured. The cathode maintained the steel at a potential of approximately −120 mV (versus a saturated calomel electrode). In this arrangement chloride ions diffused from the solution in the tank through the concrete towards the steel. Eventually the chloride content at the steel was sufficient to initiate corrosion. This was indicated by a very sharp rise in the current between the steel and the cathode from a few micro amps to tens or hundreds of micro amps. The specimens were subsequently removed from the tank and split to visually examine the condition of the steel surface. This was photographed. The percentage area of the voids was quantified on a cast external surface of the concrete and, in many cases, at the steel surface using an image analysis system in which the voids were turned into black pixels in a bitmap which could be expressed as a percentage of the total number of pixels. The percentage voids at the interface (the steel surface) is compared with that at the cast surface in FIG. 2.

The chloride profiles were measured by grinding to produce dust samples at 1 mm depth increments within 2 hours of removing the concrete specimens from the tank. The chloride content of each sample was determined by acid soluble extraction in a nitric acid solution followed by potentiometric titration against silver nitrate. This gave the chloride profile (chloride as a function of depth) at the time the specimens were removed from the tank.

A diffusion profile given by the equation was then fitted to this data:

$$C(xt) = C_s \, erfc(x/2Dt)$$

Where $C(xt)$ is the chlorine content as a function of distance x and time t, $C_s$ is the chloride content at the concrete surface and D is the apparent diffusion coefficient. This model was then used to calculate the chloride content at the depth of the steel at the time corrosion initiation was detected by current measurements.

Additions were made to this basic experimental procedure to produce the Examples.

Example 1
Effect of Entrapped Air Voids at the Steel on Chloride Threshold Level.

Compaction time of the specimens was varied to, leave a variable quantity of entrapped air in the concrete and therefore a variable number of entrapped air voids at the steel-concrete interface.

Figure 3:
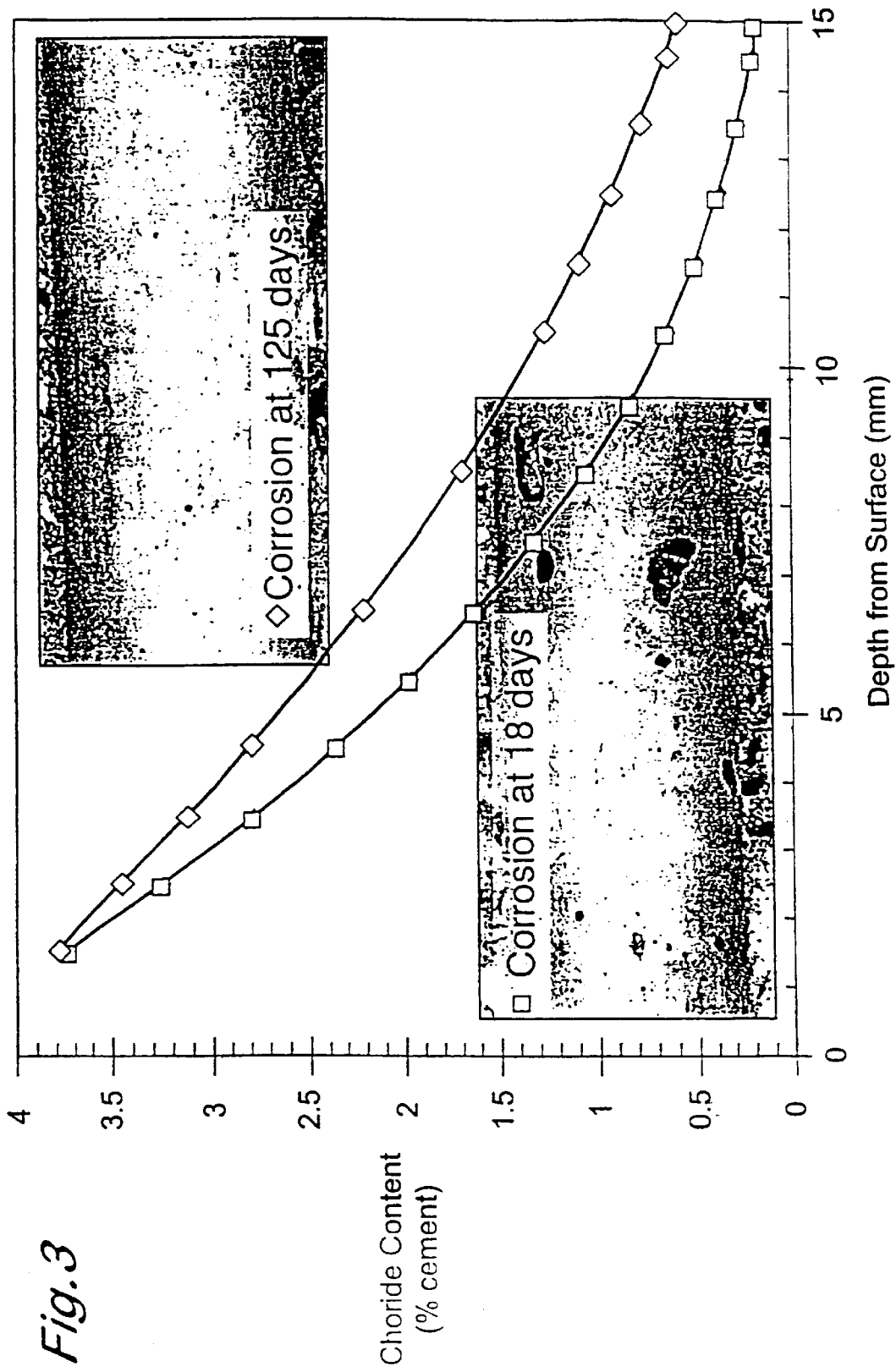
FIGS. 3 and 4 give the results obtained in Example 1.

FIG. 3 gives the. calculated chloride profiles at the time of corrosion initiation for a well compacted and poorly compacted specimen. The chloride contents at a depth of 15 mm (the concrete cover to the steel) are the chloride threshold levels determined for those specimens. Also included are the times to corrosion initiation and photographs of the condition of the steel-concrete interface. There is significantly less entrapped air at the steel in the well compacted specimens, its chloride threshold level is much higher and its time to corrosion initiation was much longer.

Figure 4:
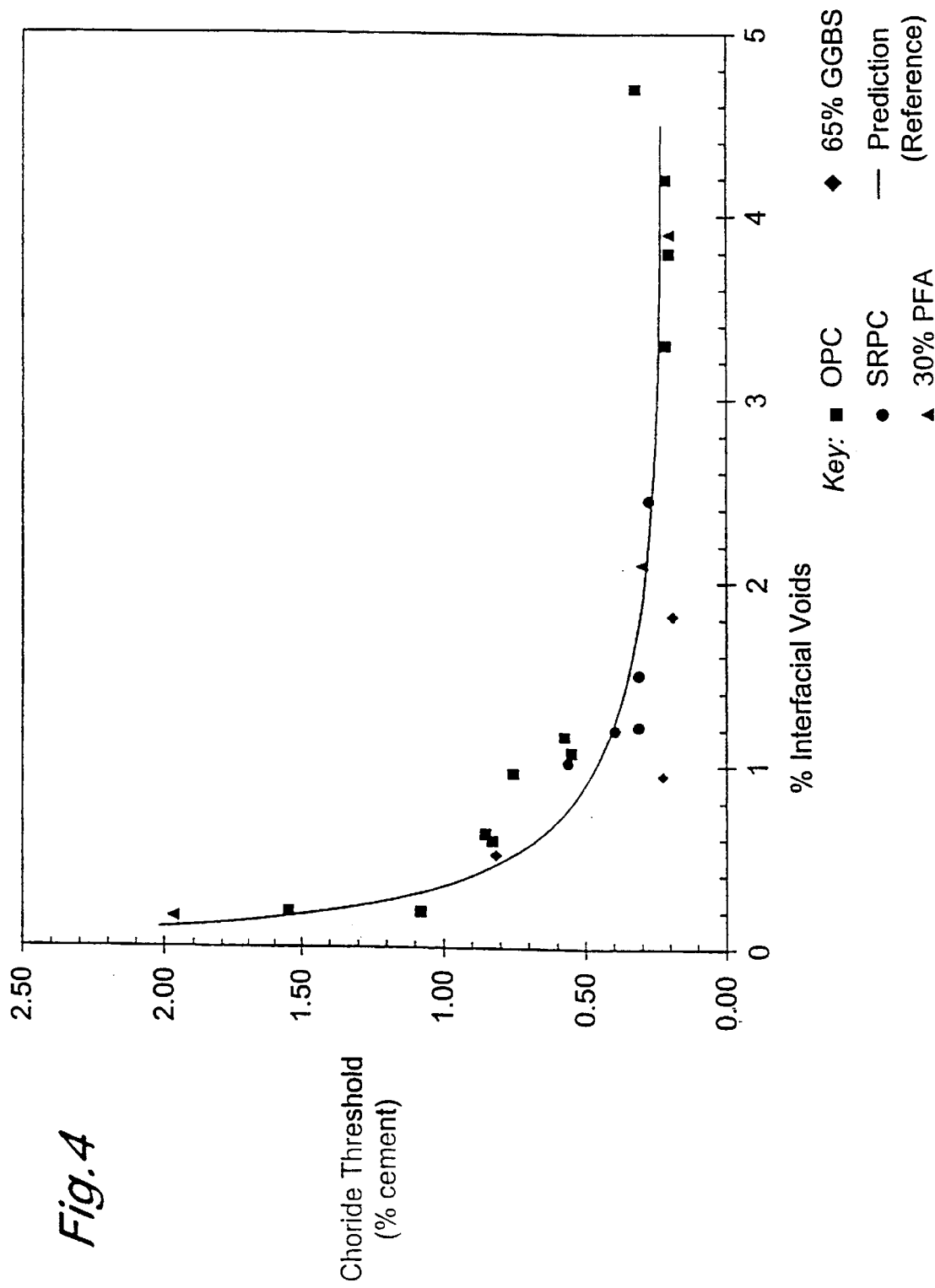

FIG. 4 gives the chloride threshold levels for those specimens as a function of the percentage area of the steel-concrete interface that was covered with voids.

This shows that at about 0.8% voids the chloride threshold begins to increase rapidly and on further reducing the void content the threshold may be increased to greater than 2% by weight of cement.

Example 2
Electrochemical Treatment on Hardened Concrete: Effect on the Chloride Threshold Level.

Chloride threshold levels were determined on concrete specimens that were electrochemically treated and aged. This was undertaken after casting and curing but prior to reducing the cover and further specimen preparation and testing.

Electrochemical treatment consisted of passing a current of 4 Amps/m$^2$ of steel to the steel bars embedded in the concrete for 10 days. This was achieved by placing the specimens in a tank containing water and an anode. The pH of the water was reduced to a value of 6 using a small quantity of nitric acid. Ageing for 7 days consisted of placing the specimens in water at 40° C. for 40 minutes each day followed by drying at room temperature. The process of ageing and the addition of nitric acid to the tank used for the electrochemical treatment were done to limit the pH rise that would have been induced by the current at the cathode.

Figure 5:
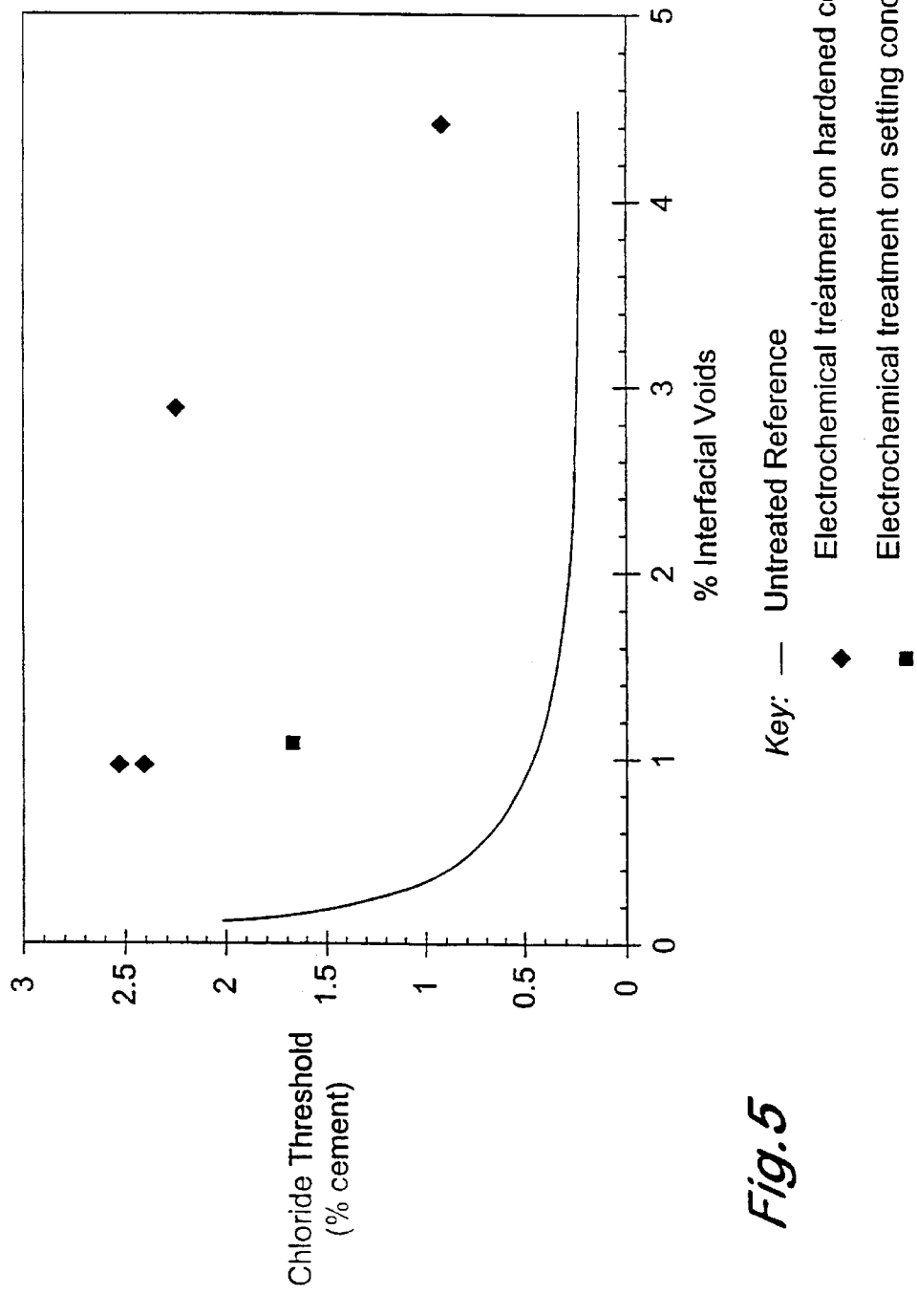
FIG. 5 gives the results obtained in Example 2.

The chloride threshold level data are given in FIG. 5 that also includes the trend line fitted to the data in FIG. 4 for comparison. Electrochemical treatment resulted in a marked increase in chloride threshold level and values above 2% were obtained for 3 of the 4 specimens.

An indication of the pH at the steel was obtained using approximately 2 grams of concrete sample that had been removed from the vicinity of the steel by grinding. Samples were removed from one specimen that had been electrochemically treated and one specimen that received no treatment but had only been aged. These samples were added to deionised water in a centrifuge tube that was sealed, shaken and left to stand for 20 days in a sealed cabinet from which carbon dioxide had been removed. The sample to water weight ratio was 2:5. These samples were then centrifuged and the pH of the solution was measured. The electrochemically treated specimen produced a sample with a pH of 12.71 while the untreated specimen produced a sample with a pH of 12.69.

These pH differences are negligible. Thus the principle effect of the electrochemical treatment and ageing was not to increase the absolute value of the pH. However the precipitation of hydroxides such as calcium hydroxide on the steel at the location of the entrapped air voids would increase the resistance to a fall in pH below a value of approximately 12.5.

This shows that an electric current will increase the chloride threshold level for a given void area at the steel at the start of the treatment. The results are included in FIG. 5.

Example 3
Electrochemical Treatment Applied to Concrete Before Hardening: Effect on Chloride Threshold Level.

A setting concrete specimen was treated electrochemically. The treatment started within 0.5 hour of the concrete being cast.

The electrochemical treatment consisted of holding the steel at −900 mV on the saturated calomel electrode (SCE) for the first 18 hours. The current was then held constant at 500 mA/square metre for the next 24 hours and it was then reduced to 300 mA/square metre for the next 90 hours. The remainder of the preparation and testing of the specimen was as described above in the section experimental procedure common to all the examples.

The total charge passed was 1.7 amp days per square metre of steel which may be compared with the 40 amp days per square metre of steel for the hardened specimens. It was unexpected that the treatment applied to the concrete before hardening gave a significant benefit with a much lower charge. The results are included in FIG. 5 and show that the chloride threshold level was increased with a relatively small charge at a void content of about 1%.

Example 4
Effect of Coating the Steel with Calcium Hydroxide Suspended in Diethylene Glycol Ether Prior to Casting the Concrete on the Chloride Threshold Level.

Chloride threshold levels were determined on concrete specimens containing steel that had been coated with a suspension of calcium hydroxide in diethylene glycol ether. This coating was applied after cleaning the steel but prior to casting the concrete. This coating was chosen to present a resistance to a pH fall after the concrete was cast. Furthermore carbonation of the coating would be limited by the absence of water.

Figure 6:
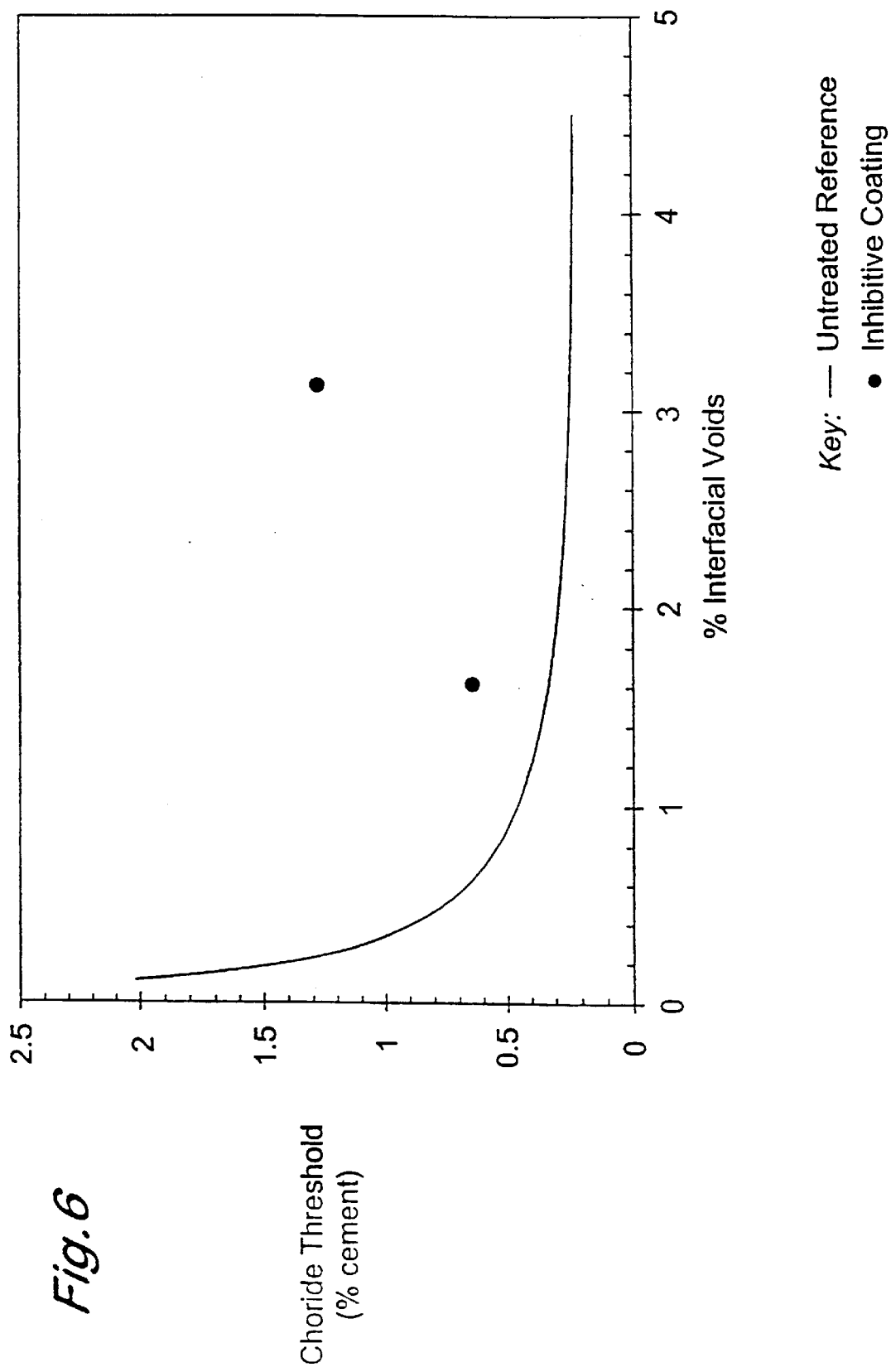
FIG. 6 gives the results obtained in Examples 3 and 4.

The chloride threshold level data are given in FIG. 6 together with the trend line fitted to the data in FIG. 4 for comparison. The voids at the steel surface could not be accurately measured because of the concrete coating. Thus this data is plotted against the percentage voids at the cast surface. The coating resulted in an increase in chloride threshold level for a given entrapped air void content. The results are shown in FIG. 6.

This shows that a coating of solid alkali on the steel will increase the chloride threshold level for a given void area on the steel.

Example 5
Use of the Superplasticiser Conplast M4 to Reduce Entrapped Air Void Content.

Chloride threshold levels were determined on concrete specimens which used a sulphonated melamine formaldehyde superplasticiser known as Conplast M4 obtained from Fosroc International to reduce the entrapped air void content by improving the workability as opposed to its common useage as a water reducing agent or an agent to minimise the need for concrete vibration aids. 1% Conplast M4 by weight of cement was added to the concrete mix prior to casting the concrete specimen. This superplasticiser was chosen because it does not react in concrete to produce gas.

The chloride threshold level data are given in FIG. 7 together with the trend line fitted to the data in FIG. 4 for comparison. The superplasticiser resulted in a reduction in voids and increase in chloride threshold level when compared to that which could be achieved by concrete compaction in the absence of superplasticiser.

This shows that a superplasticiser may reduce the void area on the steel and increase the chloride threshold level.
Experimental Details for Scanning Electron Microscope Examination
Details Common to Examples 6, 7, 8 and 9.

Cylindrical concrete specimens 72 mm in diameter were cast with a centrally located steel ribbon (17 mm wide by 70 mm long-length embedded in the concrete). The 0.4 free water/cement ratio concrete contained 275 kgm$^{-3}$ ordinary Portland cement (OPC), 680 kgm$^{-3}$ fine aggregate (grade M sand) and 1230 kgm$^{-3}$ 10 mm aggregate (Thames valley gravel). The specimens were cured for 2 weeks. Sample preparation consisted of cutting a segment containing the steel, drying, vacuum impregnating with resin, lapping and polishing.

Preliminary attempts to produce a polished cross section of steel in concrete for SEM examination resulted in a fine crack at the interface. Such problems have plagued other investigations. Possible causes of defects are cutting and polishing materials of different hardness, small differences in expansion when the samples were oven dried, drying shrinkage of the cement paste and leaching of soluble species during polishing. A number of steps were taken to limit these effects. A thin (50 μm) steel ribbon was used to limit the adverse effects of cutting and polishing. The samples were firmly supported during polishing and oil based abrasive media were used. The need for drying was reduced as samples were examined in a low vacuum SEM at a pressure of 9 Pa. Limited drying of the samples was undertaken at room temperature. The low vacuum conditions also meant that conductive coating of the sample was not required. As a result samples with a good steel-concrete interface could be consistently produced.

A JEOL 5410LV SEM was used.
The instrumental parameters for SEM were:

accelerating voltage=20 kV;
loaded beam current=55 □A;
beam spot size (SS)setting=12.

Example 6
Included for Comparative Purposes.

A control specimen (PS1) for comparison was cast with no additions to the above experimental method.

This is shown in FIG. 8 which is a backscattered electron image obtained in the scanning electron microscope of a polished section through the steel in the concrete. The grey scale in these images depends on the electron density of the material. The phases of interest, graded in terms of their brightness are the steel (lightest)>unhydrated cement grains>calcium hydroxide>gel (predominantly calcium silicate hydrate (CSH) and is aluminate-bearing hydrates and aggregate>porosity and voids (darkest). There is no general indication of any preferential formation of calcium hydroxide at the steel.

Example 7
Use of Reactant to Form Solid Akali by Reaction with the Pore Solution.

Calcium nitrate was dissolved in deionised water to form a saturated solution. The steel surface was cleaned by wet sanding in deionised water so that the water would wet the steel surface, instead of shrinking to form drops. The steel was then dipped in the calcium nitrate solution and was then oven dried and a specimen prepared and tested as described above. The result is given in the photo references CT 1—1. This shows that calcium nitrate on the steel can promote the formation of solid alkali on the steel.

The results are shown in FIG. 9 which is a backscattered electron image obtained in the scanning electron microscope of a polished section through the steel in the concrete.

There is a general indication that more calcium hydroxide has formed in the vicinity of the steel. Approximately 50% of the steel surface is covered by calcium hydroxide and the thickness of the calcium hydroxide is approximately 20 microns.

The feature marked A is relatively pure (free of silica contamination) and may have resulted from the reaction of a crystal of calcium nitrate with the pore solution of the hydrating cement.

Example 8
Use of a Reactant in the Concrete Mix to Form Solid Alkali by Reaction with the Pore Solution and Electrochemical Treatment.

A specimen (ETC1-2) was cast with a titanium mesh counter electrode located on the circumference of the specimen which surrounded the steel ribbon. A Luggin capillary filled with set agar gel (2% agar) and potassium chloride (3%) was partially embedded in the concrete between the steel and the counter electrode. A aqueous solution containing 5% calcium nitrate by weight of cement was added to the concrete mix prior to casting. A saturated calomel reference electrode was attached to the Luggin probe after casting the specimen. An electric current was then passed to the steel by holding the potential of the steel at −800 mV relative to the saturated calomel electrode reference electrode using a potentiostat while the concrete set and hardened starting within 0.5 hour of casting the concrete. The current was logged as a function of time and the charge passed as a function of time was calculated. The total charge passed was 0.35 Amp days per square metre of steel.

This shows that an electric current can produce a layer of calcium hydroxide at the steel surface when calcium nitrate is added to the concrete mix.

The results are shown in FIG. 10 which is a backscattered electron image obtained in the scanning electron microscope of a polished section through the steel in the concrete.

There is a clear indication of the formation of a layer of calcium hydroxide on the steel. Approximately 70% of the steel surface is covered by the layer and the thickness of the layer is about 10 microns.

There is also generally more calcium hydroxide in the cement paste.

Example 9
Use of Zinc as a Sacrificial Anode and a Reactant in the Concrete Mix to form Solid Alkali by Reaction with the Pore Solution.

A specimen was cast containing a zinc disc 45 mm in diameter and 5 mm thick. The zinc was located at the edge and the steel was located at the centre of the concrete specimen. An aqueous solution containing 5% calcium nitrate by weight of cement was added to the concrete mix prior to casting. The zinc was connected to the steel through a current measuring device. The current was logged as a function of time and the charge passed as a function of time was calculated.

Figure 11:
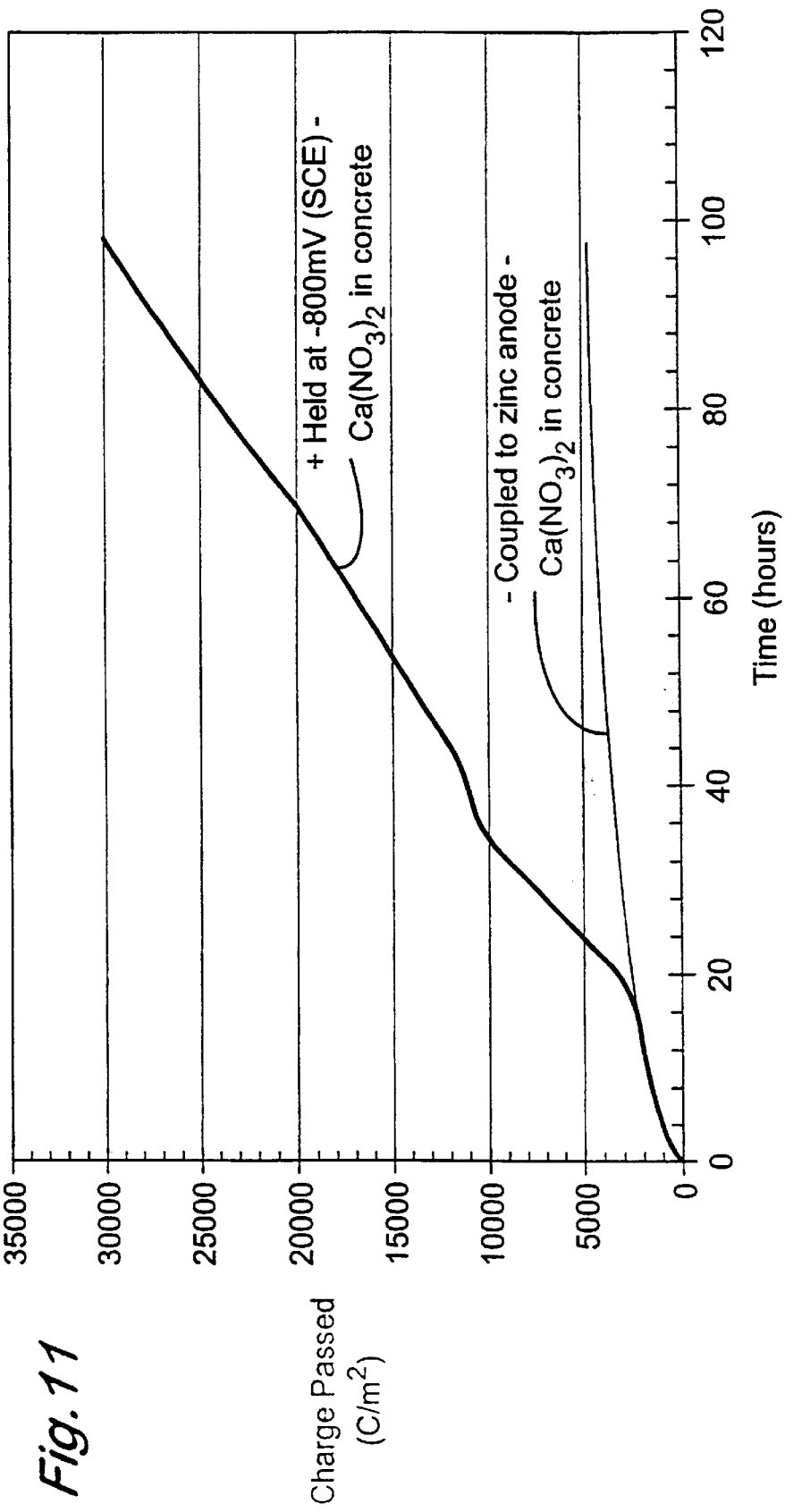
FIG. 11 is a graph showing the charge passed in Example 9.

The charge passed is shown in FIG. 11, which shows the number of coulombs per square metre of steel against time, and may be compared with the charge passed in Example 8

FIG. 11 shows the charge passed to the specimen held at −800 mV (SCE)(ETC1-2) by the electrochemical treatment compared with charge passed when a specimen was coupled to a zinc anode placed directly in the concrete.

This shows that a sacrificial anode may be used to pass charge to the steel.

What is claimed is:

1. A reinforced concrete wherein the content of voids in the concrete at the surface of the steel reinforcement is below 0.8%, preferably below 0.5% by area of the steel and in which there is a layer of solid alkali on the steel surface.

2. A reinforced concrete as claimed in claim 1 wherein the layer is from 1 to 100 microns in thickness and covers at least 20% of the steel surface.

3. A reinforced concrete as claimed in claim 2 wherein the layer covers at least 60% of the steel surface.

4. A reinforced concrete as claimed in claim 1 wherein the chloride threshold level is at least 0.5% by weight of the cement.

5. A reinforced concrete wherein the content of voids in the concrete at the surface of the steel is below 0.8% preferably below 0.5% by area of the steel and wherein one or more sacrificial anodes are connected to the steel reinforcement the galvanic effect being sufficient to generate a current to cause the formation of alkali at the surface of the steel but avoid the discharge of hydrogen gas.

6. A process for reducing corrosion of steel reinforcement in concrete which process comprises forming a reinforced concrete in which the voids at the steel surface are below 0.8% by area of steel and in passing a direct electric current between an anode and the reinforcement as cathode to form a layer of solid alkali at the steel surface, the layer being at least 1 micron in thickness and covering at least 20% of the steel surface.

7. A process for reducing corrosion of steel reinforcement in reinforced concrete which process comprises, prior to casting the concrete, applying an alkali to the steel to form a layer, preferably at least one micron in thickness and covering at least 20% of the steel surface, and casting the concrete and controlling the casting conditions so that the content of voids in the concrete at the steel surface is below 0.8%, preferably below 0.5% by area of the steel surface.

8. A process for reducing corrosion of steel reinforcement in reinforced concrete which process comprises:

soaking the concrete with water to cause the water to penetrate the concrete and passing a direct electric current between an anode and the steel reinforcement as cathode to form a layer of solid alkali preferably at least one micron in thickness on the steel surface.

9. A process for reducing the corrosion of steel in reinforced concrete which process comprises forming a layer of solid alkali preferably at least one micron in thickness on the steel by passing a direct electric current between an anode and the reinforcement as cathode before the concrete has hardened and wherein the conditions are controlled to avoid the discharge of hydrogen gas.

10. A process as claimed in claim 9 wherein the potential of the cathode is maintained at a level to avoid the discharge of hydrogen gas.

11. A process as claimed in claim 9 wherein an agent which reacts to form alkali has been added to the concrete mix prior to casting the concrete.

12. A process as claimed in claim 9 wherein the electric current is provided by one or more sacrificial anodes connected to the steel.

13. An electrochemical process for reducing the corrosion of steel reinforcement in concrete which process comprises:

passing a direct electric current between an anode and the steel reinforcement as cathode for sufficient time to form solid alkali at the surface of the reinforcement and enhancing the formation of solid alkali by one or more of the following steps:
   (i) providing an additional source of calcium ions in the concrete forming mixture
   (ii) including an agent in the concrete mixture to assist the migration of calcium ions
   (iii) including an agent in the concrete forming mixture to modify the morphology of the calcium hydroxide
   (iv) applying a coating of alkali rich material to the reinforcement before casting the concrete
   (v) placing a material on the steel which will react with the products of cathodic reduction to generate solid alkali at the steel
   (vi) adding an agent to the steel prior to casting the concrete that will react with the pore solution of the concrete to form solid alkali at the steel
   (vii) adding an agent to the concrete mixture that will migrate to the steel interface where it will precipitate to form solid alkali.

14. A process for reducing the corrosion of steel reinforcement in reinforced concrete which process comprises, prior to casting the concrete, applying a solid alkali to the steel, preferably to provide a layer of alkali at least one micron and less than 500 microns in thickness in thickness, and then casting the concrete.

15. A process as claimed in claim 14 wherein the alkali is applied to the steel as a dispersion in a non aqueous liquid.

16. A process for reducing the corrosion of steel reinforcement in reinforced concrete which process comprises prior to casting the concrete, applying to the surface of the steel an agent that will react with the pore solution of the concrete to form solid alkali on the steel, preferably in the form of a layer at least one micron in thickness and then casting the concrete.

* * * * *